(12) United States Patent
Luo et al.

(10) Patent No.: US 9,733,498 B2
(45) Date of Patent: Aug. 15, 2017

(54) DISK RESONATOR BASED ON A COMPOSITE STRUCTURE

(71) Applicant: Oracle International Corporation, Redwood Shores, CA (US)

(72) Inventors: Ying Luo, San Diego, CA (US); Xuezhe Zheng, San Diego, CA (US); Shiyun Lin, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/880,045

(22) Filed: Oct. 9, 2015

(65) Prior Publication Data

US 2017/0102563 A1    Apr. 13, 2017

(51) Int. Cl.
*G02F 1/035* (2006.01)
*G02F 1/025* (2006.01)
*G02B 6/122* (2006.01)
*G02B 6/12* (2006.01)
*G02F 1/015* (2006.01)

(52) U.S. Cl.
CPC .......... *G02F 1/025* (2013.01); *G02B 6/12004* (2013.01); *G02B 6/1228* (2013.01); *G02B 2006/12061* (2013.01); *G02B 2006/12142* (2013.01); *G02F 2001/0151* (2013.01); *G02F 2202/104* (2013.01)

(58) Field of Classification Search
CPC ............. G02F 1/025; G02F 2001/0151; G02F 2202/104; G02B 6/12004; G02B 6/1228; G02B 2006/12061

USPC .......... 385/2, 3, 8, 9, 27–29, 31, 32
See application file for complete search history.

(56) References Cited

U.S. PATENT DOCUMENTS

| 8,213,751 B1 * | 7/2012 | Ho ......................... G02B 6/305 385/1 |
| 8,805,130 B2 * | 8/2014 | Lipson ............... G02B 6/12007 385/132 |
| 9,122,004 B1 * | 9/2015 | Roth .................. G02B 6/12004 |
| 9,134,169 B2 * | 9/2015 | Li ......................... G01J 1/0209 |

(Continued)

OTHER PUBLICATIONS

K. Shastri et al: "CMOS photonics" Asian Communications and Photonics Conference, TuR3, 2009.

(Continued)

*Primary Examiner* — Ellen Kim
(74) *Attorney, Agent, or Firm* — Park, Vaughan, Fleming & Dowler LLP (57) ABSTRACT

An optical modulator is described. This optical modulator may be implemented using silicon-on-insulator (SOI) technology. In particular, the optical modulator may include a carrier-accumulation-type micro-disk resonator fabricated using optical waveguides having a composite structure. Moreover, the composite structure may embed a metal-oxide semiconductor capacitor in the disk resonator. For example, the composite structure may include polysilicon disposed on an oxide layer, which is disposed on a silicon layer in an SOI platform. The optical modulator may have high modulation efficiency and high-speed operation. In addition, the optical modulator may have a compact footprint with low power consumption.

18 Claims, 6 Drawing Sheets

(56) References Cited

U.S. PATENT DOCUMENTS

| | | | | |
|---|---|---|---|---|
| 9,140,853 B2* | 9/2015 | Varghese | ............ | G02B 6/12007 |
| 9,207,469 B2* | 12/2015 | Yang | ........................ | G02F 1/025 |
| 9,239,475 B2* | 1/2016 | Akiyama | .............. | G02F 1/0121 |
| 9,274,353 B1* | 3/2016 | Dong | .................... | G02F 1/0121 |
| 9,285,540 B2* | 3/2016 | Bauters | ................ | H01L 31/105 |
| 9,360,627 B2* | 6/2016 | Bi | ...................... | G02B 6/29398 |
| 2009/0078963 A1* | 3/2009 | Khodja | .............. | G02B 6/12007 |
| | | | | 257/189 |

OTHER PUBLICATIONS

L. Liao et al: "High speed silicon Mach-Zehnder modulator" Optics Express, vol. 13, No. 8, 3129-3135, 2005.
K. Kubota et al: "Thermal Profiles During Recrystallization of Silicon-On-Insulator with Scanning Incoherent Light Line Source", Applied Physics Letters 46(12):1153-1155, Jun. 1985.
G. Li et al: "Ring Resonator Modulators in Silicon for Interchip Photonic Links" IEEE Journal of Selected Topics in Quantum Electronics, vol. 19, No. 6, Nov./Dec. 2013.

* cited by examiner

DISK RESONATOR BASED ON A COMPOSITE STRUCTURE

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure relates to techniques for communicating optical signals. More specifically, the present disclosure relates to an optical disk resonator that includes a composite silicon structure.

Related Art

Silicon photonics is a promising technology that can provide large communication bandwidth, large density, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors.

Electro-optical modulation in silicon can be implemented by an electro-absorption or an electro-optical effect. In order to achieve high modulation efficiency, electro-absorption-based optical modulators generally involve the hybrid integration of other materials (such as germanium or germanium-silicon alloy) into a silicon-on-insulator (SOI) platform. But these intensity optical modulators typically have very high optical waveguide loss because of indirect band-gap absorption, which can limit the optical modulator length and, thus, the overall performance. Alternatively, optical modulation in silicon can also be implemented by exploiting the free-carrier dispersion effect of silicon, in which the concentration of free charges in silicon changes the real and imaginary parts of the index of refraction. This type of phase optical modulator is often implemented in a Mach-Zehnder interferometer (MZI) or a resonator structure that converts a phase change into an intensity modulation.

In an electro-optical silicon optical modulator, electrical manipulation of the charge density interacting with light can be achieved through one of three major mechanisms: carrier injection, carrier depletion and carrier accumulation. Carrier injection-based silicon optical modulators typically use forward-biased pin diodes to inject free carriers into the intrinsic region with low drive voltage. This modulation technique is usually very efficient and has low optical loss. However, the intrinsic speed of carrier injection-based silicon optical modulators is often very low because of minority-carrier diffusion. Consequently, signal pre-emphasis is usually required to achieve a speed of 10 Gb/s or more.

Carrier depletion-based silicon optical modulators, in which the depletion region of a pn junction is modulated under reverse bias, are typically favored for high-speed operation and low-power modulation. However, this type of optical modulator usually has a low modulation efficiency. Larger modulation often requires higher p/n doping, which can increase the insertion loss.

Carrier accumulation-based optical modulators typically use a metal-oxide-semiconductor (MOS)-capacitor type of structure (such as using polysilicon, a dielectric layer and the silicon layer in an SOI platform) to accumulate free carriers on either side of the dielectric layer (such as an oxide layer). With a thin oxide layer (typically less than 10 nm) inserted in the middle of the optical waveguide, this structure can achieve a large phase shift with small bias voltage. In addition, the MOS capacitor may be operated in an accumulation mode so that the optical modulator bandwidth is not limited by carrier recombination inside the silicon.

However, an MOS-capacitor structure often has its own limitations when used for high-speed optical modulators. In MOS-capacitor type optical modulators based on MZIs, the typical length of the phase-shifting element is in the millimeter range. Although the dynamic operation of carrier-accumulation modulators is not limited by the relatively long minority carrier lifetime, it is often limited by the optical modulator resistance and capacitance. In particular, MOS MZI optical modulators tend to have much higher capacitance, which is associated with the long arms.

Furthermore, a slab optical waveguide structure usually has to be implemented in the MZI to enable the electrical connections to driving pads. In order to achieve high-modulation speed, shallow-etched optical waveguides are typically preferred. However, a thick silicon slab may reduce the optical mode overlap with the electrical charges, and thus may lower the effective change in the index of refraction. Consequently, the slab thickness is typically selected in an attempt to balance the bandwidth and efficiency, which often results in an RC-limited bandwidth.

Additionally, the top silicon layer of MOS-capacitor optical modulators is usually polysilicon, which has much higher loss than crystalline silicon because of defects in the material lattice. For a typical MZI with an arm length of 1 mm, this extra loss from polysilicon scattering can be significant. Consequently, the total insertion loss of these optical modulators is often too high for most applications.

Hence, what is needed is an electro-optical modulator without the above-described problems.

SUMMARY

One embodiment of the present disclosure provides an integrated circuit. This integrated circuit includes a modulator, with: a bus optical waveguide including an instance of a composite optical waveguide with a silicon layer, an oxide layer and a polysilicon layer; and a disk resonator. The disk resonator includes: another instance of the composite optical waveguide; a contact for the silicon layer within an inner radius of the disk resonator; and a second contact disposed on the polysilicon layer.

Note that the silicon layer, the oxide layer and the polysilicon layer may constitute a metal-oxide-semiconductor (MOS) capacitor.

Moreover, the bus optical waveguide may include: an optical taper before the disk resonator that transitions the optical mode from the silicon layer to the composite optical waveguide; and a second optical taper after the disk resonator that transitions the optical mode from the composite optical waveguide to the silicon layer.

Furthermore, the contact may be n-type and the second contact may be p-type.

Additionally, the disk resonator has a radius less than 5 µm and/or the oxide layer may have a thickness less than 10 nm.

In some embodiments, the bus optical waveguide and the disk resonator include channel optical waveguides.

Note that the polysilicon layer may be disposed on a buried-oxide layer in a silicon-on-insulator technology.

Another embodiment provides a system that includes: a processor; a memory that stores a program module; and the integrated circuit. During operation, the program module is executed by the processor.

Another embodiment provides a method for modulating an optical signal, which may be performed by the modulator. During operation, a bus optical waveguide conveys the optical signal, where the bus optical waveguide includes an instance of a composite optical waveguide with a silicon layer, an oxide layer and a polysilicon layer. Then, an optical taper transitions the optical signal from the silicon layer to the composite optical waveguide. Moreover, the optical signal is optically coupled from the bus optical waveguide to a disk resonator, where the disk resonator includes another instance of the composite optical waveguide, a contact for the silicon layer within an inner radius of the disk resonator, and a second contact disposed on the polysilicon layer. Next, the disk resonator modulates the optical signal based on an electrical signal conveyed by the contact and the second contact, and the modulated optical signal is optically coupled from the disk resonator to the bus optical waveguide. Furthermore, a second optical taper transitions the modulated optical signal from the composite optical waveguide to the silicon layer. Additionally, the bus optical waveguide conveys the modulated optical signal.

Another embodiment provides a composite optical waveguide with a silicon layer, an oxide layer and a polysilicon layer.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical modulator (which is sometimes referred to as an 'electro-optical modulator'), an integrated circuit that includes the optical modulator, a system that includes the integrated circuit, and a technique for modulating an optical signal are described. This optical modulator may be implemented using silicon-on-insulator (SOI) technology. In particular, the optical modulator may include a carrier-accumulation-type micro-disk resonator fabricated using optical waveguides having a composite structure. Moreover, the composite structure may embed a metal-oxide semiconductor capacitor in the disk resonator. For example, the composite structure may include polysilicon disposed on an oxide layer, which is disposed on a silicon layer in an SOI platform.

The disk resonator may confine light in a high-quality factor Q resonator (such as a Q of 3000-5000) that effectively increases the optical path length, and thus may enhance the interaction with the modulated carrier distribution (i.e., the optical modulator may have high modulation efficiency). Moreover, the compact optical modulator may also reduce or minimize the total optical modulator capacitance, which, in turn, enables high-speed and ultra-low power operation. Furthermore, the disk resonator may not need a slab to confine the light. By eliminating the slab, the disk resonator may increase or maximize the overlap of the sheet charge layers with the optical mode, and may also reduce or minimize the series resistance of the optical modulator by removing the bottle neck from the silicon-slab resistance. Consequently, in addition to reducing the overall capacitance, the optical modulator may provide smaller series resistance, such that the overall RC-time-limited bandwidth may be increased. Additionally, as described further below with reference to FIG. 3, by including two mode converters before and after the coupling region on the bus optical waveguide, the excess optical loss from the scattering in the top polysilicon layer and absorption may be reduced or minimized as a result of the ultra-compact footprint of the optical modulator. Therefore, under carrier-accumulation operating conditions, high-speed modulation of up to 25 Gb/s can be achieved.

In the discussion that follows, particular layouts of the optical modulator are used as an illustration. However, the modulation technique may be used with a wide variety of optical modulator designs and architectures.

Figure 1:
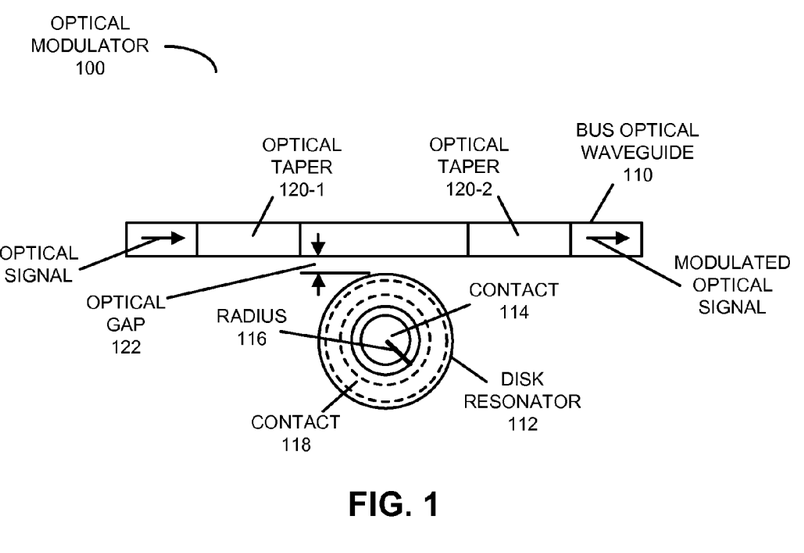
FIG. 1 is a block diagram illustrating a top view of an optical modulator in accordance with an embodiment of the present disclosure.
Figure 2:
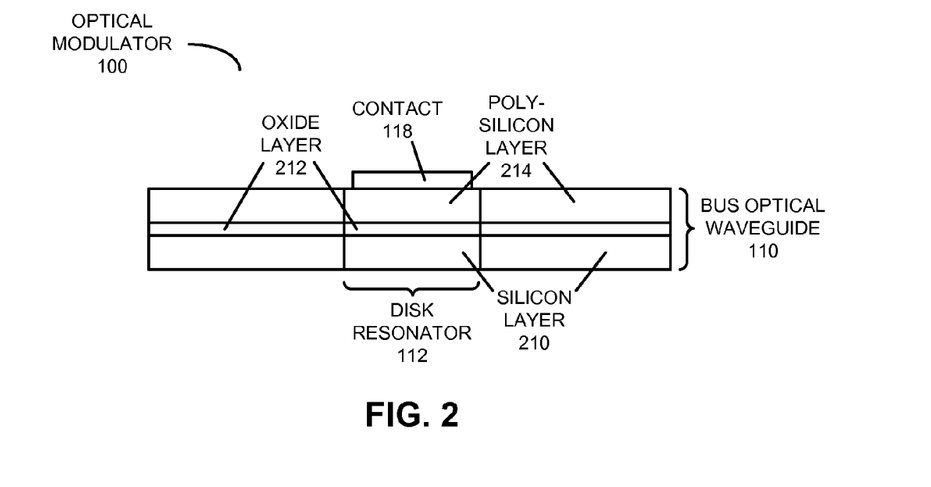
FIG. 2 is a block diagram illustrating a cross-sectional view of the optical modulator of FIG. 1 in accordance with an embodiment of the present disclosure.

We now describe embodiments of the optical modulator. FIG. 1 presents a block diagram illustrating a top view of an optical modulator 100. This optical modulator may include a bus optical waveguide 110 and a disk resonator 112. Furthermore, as shown in FIG. 2, which presents a block diagram illustrating a cross-sectional view of optical modulator 100, bus optical waveguide 110 and disk resonator 112 may each include an instance of a composite optical waveguide with a silicon layer 210, an oxide layer 212 (which is sometimes referred to as a 'gate oxide') and a polysilicon layer 214. Note that silicon layer 210, oxide layer 212 and polysilicon layer 214 may constitute an MOS capacitor. Moreover, as described further below with reference to FIG. 4, silicon layer 210 may be disposed on a buried-oxide layer in an SOI technology or platform.

Referring back to FIG. 1, optical modulator 100 may include a contact 114 for silicon layer 210 (FIG. 2) within an inner radius 116 of disk resonator 112, and a contact 118 that is disposed on polysilicon layer 214 (FIG. 2). Note that contact 114 may be n-type and contact 118 may be p-type. (Alternatively, contact 114 may be p-type and contact 118 may be n-type.) Silicon layer 210 (FIG. 2) may be n-type doped and contacted in the center of disk resonator 112 by contact 114 using n+ implantation and metal vias. Moreover, top polysilicon layer 214 (FIG. 2) may be doped to a similar level with p-type species, and connected through top circular p+ contact 118. By using interior n+ contact 114 and p+ contact 118, the need for an outer slab for disk resonator 112 may be eliminated. (Consequently, bus optical waveguide 110 and disk resonator 112 may include channel optical waveguides that are etched down to the buried-oxide layer below silicon layer 210 in FIG. 2.) In turn, the absence of a slab outer wall may enable disk resonator 112 to have radius 116 as small as 2-3 µm (more generally, radius 116 may be less than 5 µm), which may provide a large free-spectral range, greatly reduced capacitance and, thus, a much lower modulation energy.

In an exemplary embodiment, the n-type doping and/or the p-type doping is $2\text{-}4\cdot10^{18}$ cm$^{-3}$, which may be chosen in order to maintain a sufficiently short RC time constant for high-speed modulation. These doping levels (and the resulting low resistance of contacts 114 and 118) may be facilitated by the use of contacts 114 and 118 that are radially or laterally displayed from the MOS capacitor in disk resonator 112, so that the optical loss in disk resonator 112 is not also increased.

Furthermore, silicon layer 210 (FIG. 2) may have a thickness of 200-250 nm, oxide layer 212 (FIG. 2) may have a thickness less than 10 nm (such as 5 nm), polysilicon layer 214 (FIG. 2) may have a thickness of 200-250 nm and/or the size of optical gap 122 between bus optical waveguide 110 and disk resonator 112 may be 100-250 nm. Note that oxide layer 212 (FIG. 2) may include silicon dioxide. While a thinner oxide layer 212 (FIG. 2) increases the capacitance, it may also increase the modulation efficiency. For example, the modulation efficiency of optical modulator 100 may be 5× that of existing ring-resonator optical modulators, and the peak-to-peak modulation voltage across contacts 114 and 118 may be less than or equal to 2 V. For optimal modulation efficiency, the composite structure may be as symmetric as possible in order to maximize the optical mode overlap with charges. In addition, a thinner silicon layer 210 and polysilicon layer 214 (FIG. 2) may enhance the confinement of the optical mode, and may reduce optical loss and the RC time constant.

Note that, typically, the optical loss associated with polysilicon prohibits its use in an optical modulator. However, here polysilicon can be used because of the small size of optical modulator 100, and because the heavy doping used for a high-speed optical modulator already degrades the quality factor, so that polysilicon layer 214 (FIG. 2) may not appreciably affect the quality factor.

Figure 3:
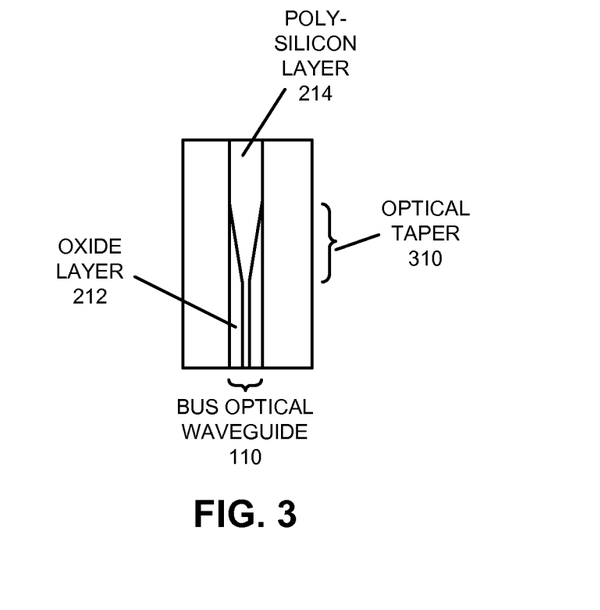
FIG. 3 is a block diagram illustrating an optical taper in a bus optical waveguide in the optical modulator of FIGS. 1 and 2 in accordance with an embodiment of the present disclosure.

The total optical loss in the optical modulator can be reduced using optical tapers. As shown in FIG. 3, which presents a block diagram illustrating an optical taper 310 in bus optical waveguide 110 in optical modulator 100 in FIGS. 1 and 2, using instances of optical taper 310 the optical mode may be transitioned from silicon layer 210 (FIG. 2) into the composite optical waveguide and back proximate to disk resonator 112 (FIG. 1). Note that optical taper 310 may have a length of 50 µm (over which the width of polysilicon layer 214 decreases from the width of bus optical waveguide 110 to 80-130 nm or increases from 80-130 nm to the width of bus optical waveguide 110), and the street optical waveguide may have a width of 0.4 µm.

Referring back to FIG. 1, during operation of optical modulator 100, an optical signal may be received from bus optical waveguide 110. The optical mode associated with this optical signal may be transitioned from silicon layer 210 to the composite optical waveguide by optical taper 120-1. Then, the optical signal may be optically coupled to disk resonator 112. A time-varying modulation voltage corresponding to data may be applied to contacts 114 and 118 to modify the carriers in disk resonator 112, thereby optically modulating the optical signal. Next, the modulated optical signal may be optically coupled back to bus optical waveguide 110. Furthermore, optical taper 120-2 after disk resonator 112 (FIG. 1) may transition the optical mode from oxide layer 212 to silicon layer 210 in FIG. 2, transitioned from the composite optical waveguide to silicon layer 210 in FIG. 2 by optical taper 120-2, and the modulated optical signal may be output on bus optical waveguide 110.

In an exemplary embodiment, the optical modulator achieves ultralow-energy operation (e.g., single digit femtojoule per bit) at high data rates (greater than 25 Gb/s) by combining the high modulation efficiency of an MOS capacitor with the minimized resistance and overall capacitance from a compact micro-disk resonator. For a typical silicon optical modulator based on the carrier-plasma dispersion effect, the effective change in the index of refraction of the optical waveguide ($\Delta n_{eff}$) is the overlap integral between the change in the material index of refraction and the optical mode $$\Delta n_{eff} \propto \frac{N \cdot \Delta w}{H},$$

where N is the doping level of both sides of the MOS capacitor (symmetric doping is assumed for simplicity), $\Delta w$ is the change of charge or depletion width, and H is the height of the optical waveguide. The total charge changes $\Delta Q$ of the optical modulator is related to the capacitance C (and thus $\Delta w$) by $$\Delta Q = C \cdot V = q \cdot N \cdot \Delta w \cdot W \cdot L,$$

where V is the applied voltage, q is the electronic charge, W is the optical waveguide width and L is the total length of the optical modulator. Therefore, the overall electro-optical response is proportional to the junction capacitance per unit volume $$\Delta n_{eff} \propto \frac{C \cdot V}{W \cdot L \cdot H}.$$

Because the junction cross-section is generally fixed along the beam propagation direction, it may be desirable to maximize the junction capacitance per unit area in order to achieve high modulation efficiency. In a pn diode, the junction capacitance per unit area $C_j$ can be expressed as $$C_j = \frac{\varepsilon_{Si}}{w_d},$$

where $\varepsilon_{Si}$ is the dielectric constant of silicon, and $w_d$ is the total junction depletion width, which is a function of the doping levels. If the optical modulator is based on a ring resonator, where the pn diode is usually doped in the $10^{18}$ cm$^{-3}$ range, the depletion width is around 60-70 nm. Alternatively, for optical modulators based on MZI structures, where the optical waveguides are doped to around $10^{17}$ cm$^{-3}$ (in order to reduce the total insertion loss), the depletion width may be more than 150 nm. Therefore, the modulation efficiency may be much lower in an MZI modulator as compared to a ring resonator.

However, the unit area capacitance of the MOS capacitor in optical modulator 100 (FIGS. 1 and 2) may be determined by $$C_j = \frac{\varepsilon_{SiO_2}}{d},$$

where $\varepsilon_{SiO_2}$ is the dielectric constant of silicon and d is the thickness of the gate oxide. Obviously, the MOS-type optical modulator has much higher capacitance that the pn diode. For a typical gate oxide of 5 nm, considering that $\varepsilon_{Si}$ is 3× larger than $\varepsilon_{SiO_2}$, the MOS capacitance $C_j$ may be up to 5× larger than that of the ring resonators, and more than 10× larger than that of MZIs. In addition, the MOS capacitance may be determined by the thickness of the gate oxide only, while for the pn diode, the carrier density and the junction width may change under different ion-implantation conditions. In general, the implantation energies, doping spices, and annealing temperature may affect the final junction position and depth profiles (in particular, the lateral straggling of the junction formation). In most cases, the actual junction width may be much wider than that of the abrupt junction because of these variations. Therefore, the real improvement in the electro-optical efficiency with the MOS capacitor in optical modulator 100 (FIGS. 1 and 2) may be even larger. Furthermore, by etching through the outer side to further enhance the optical mode confinement, the MOS diode in optical modulator 100 (FIGS. 1 and 2) may have a significantly stronger and tighter optical field in the vicinity of the gate oxide, which results in a larger effective change in the index of refraction, and thus a high electro-optical efficiency.

The average consumed energy per bit for an optical modulator may be proportional to $C \cdot V^2$. Because the modulation efficiency may be 5× larger (which in the case of the disk resonator is associated with the larger resonance shift), the required driving voltage and, thus, the power consumption of optical modulator 100 (FIGS. 1 and 2) may be dramatically reduced. Moreover, in optical modulator 100 (FIGS. 1 and 2) the overall capacitance is reduced in order to obtain a reduced switching energy. In this regard, the micro-disk resonator may facilitate this objective. In particular, for a ring-resonator modulator based on a ridge optical waveguide, a smaller ring resonator typically involves deeper optical waveguide etching in order to have a small bending loss. However, the latter may result in a thinner optical waveguide slab after etching, which may result in an RC-limited bandwidth. While higher doping may be used in the optical waveguide slab, it may still require a slab thickness of more than 50 nm in order to achieve a data rate greater than 25 Gb/s. This design constraint may, therefore, lead to a minimum ring radius in the range of 5 µm.

In contrast, the composite structure of MOS diode in optical modulator 100 (FIGS. 1 and 2) may enable the use of interior contacts for electrical connections, which in turn may allow the outer feature in the micro-disk resonator to be etched through. By eliminating the outer slab, a tightly confined and compact disk resonator with a radius of 2 µm may be used in optical modulator 100 (FIGS. 1 and 2) while still maintaining a high-Q resonance. In this way, the overall disk-resonator volume may be minimized and the capacitance may be concentrated over the optically active region of the MOS junction.

Besides the low overall capacitance, optical modulator 100 (FIGS. 1 and 2) may also achieve greater than 25 Gb/s operation by reducing the series resistance. For a high-speed disk resonator with a quality factor of approximately 5000, where the photon-lifetime determined bandwidth is not the limiting factor, the RC time constant may be dominant. In optical modulator 100 (FIGS. 1 and 2), the p+ and n+ contacts may be placed inside the center of the micro-disk resonator, while still minimizing the overlap with the optical mode and avoiding excess optical loss in the accumulation response. This arrangement of the contacts may greatly reduce the optical modulator resistance by shortening the electrical path, and eliminating the large slab resistance. Additionally, this direct and short electrical path from the MOS diode may allow the applied voltage to be dropped effectively across the optically active regions of the capacitor. Therefore, this design approach may enable high-speed modulation with significantly improved performance.

In order to minimize the propagation loss from the top polysilicon layer, two optical mode converters (which are sometimes referred to as 'optical tapers') may be implemented before and after the optical coupling region on the bus optical waveguide in order to assure a smooth transfer from a crystal-silicon optical mode to the composite polysilicon-gate-oxide-silicon optical mode. This may be realized using a linear optical taper (as shown in FIG. 3) with sufficient length (e.g., less than 100 µm) in order to achieve a low loss transition. In this way, the excess optical loss from top polysilicon scattering and absorption may be minimized as a result of the ultra-compact footprint of optical modulator 100 (FIGS. 1 and 2).

In summary, a silicon optical modulator with high modulation efficiency may achieve high bandwidth and ultra-low power consumption requirements simultaneously. This optical modulator may be based on a composite silicon-optical waveguide structure. Moreover, the optical modulator may dramatically reduce the energy per bit by lowering the optical modulator-driving voltage and the overall capacitance with a compact, highly optimized MOS micro-disk resonator. In particular, the MOS capacitor may increase or maximize the resonant shift for a giving applied voltage, and the disk-resonator structure may have an etched-through outer wall for a super compact footprint. High data-rate modulation may be also enabled by the use of internal short-path contacts with a reduced RC time constant. The enhanced modulation efficiency may make this optical modulator suitable for applications requiring high-speed modulation and may also provide broadband operation in order to accommodate large temperature variations or process errors. Because the optical modulator may not require traveling-wave electrodes, it may also significantly simplify the design and fabrication yields, which may reduce the cost of the optical modulator.

Figure 4:
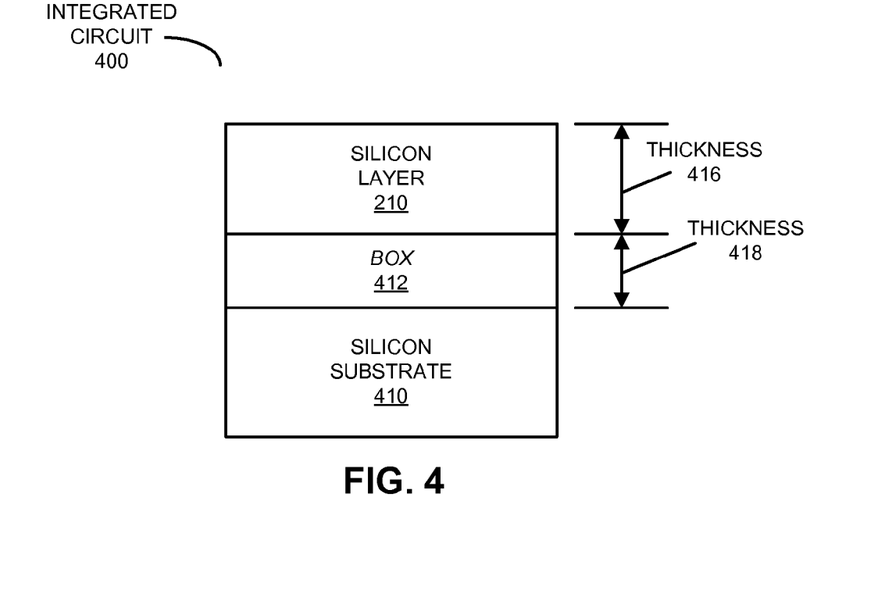
FIG. 4 is a block diagram illustrating an integrated circuit that includes the optical modulator of FIGS. 1 and 2 in accordance with an embodiment of the present disclosure.

As discussed previously, the optical modulator may be implemented in an integrated circuit, such as a photonic integrated circuit. FIG. 4 presents a block diagram illustrating an integrated circuit 400. This integrated circuit includes: a silicon substrate 410, a buried-oxide (BOX) layer 412 disposed on silicon substrate 410, and silicon layer 210 disposed on buried-oxide layer 412. As noted previously, optical components in the optical modulator may, at least in part, be included in silicon layer 210. In an exemplary embodiment, buried-oxide layer 412 includes silicon dioxide. Thus, silicon substrate 410, buried-oxide layer 412 and silicon layer 210 may constitute an SOI technology or platform.

Moreover, silicon layer 210 may have a thickness 416 that is less than 1 μm (such as 0.2-0.3 μm). Furthermore, buried-oxide layer 412 may have a thickness 418 between 0.3 and 3 μm (such as 0.8 μm). Note that a width of bus optical waveguide 110 (FIG. 1) may be 0.4-1 μm. In an exemplary embodiment, bus optical waveguide 110 (FIG. 1) conveys an optical signal (i.e., light) having wavelengths between 1.1-1.7 μm, such as an optical signal having a fundamental wavelength of 1.3 or 1.55 μm.

Figure 5:
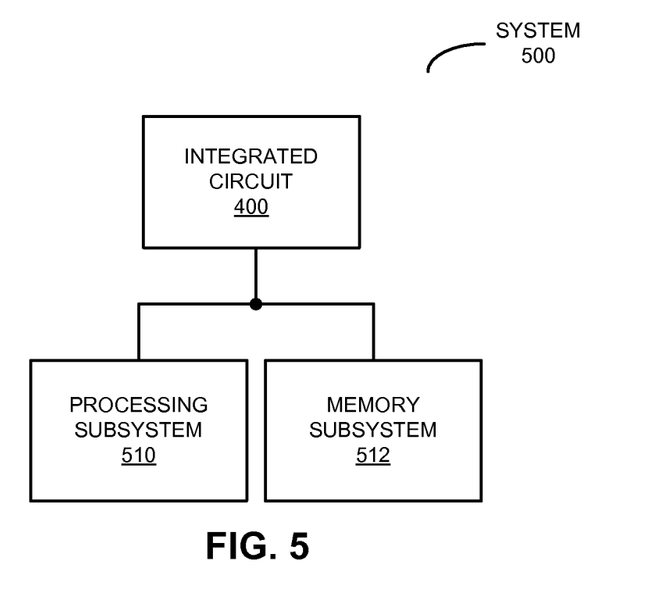
FIG. 5 is a block diagram illustrating a system that includes the integrated circuit of FIG. 4 in accordance with an embodiment of the present disclosure.

Integrated circuit 400 may be included in a system and/or an electronic device. This is shown in FIG. 5, which presents a block diagram illustrating a system 500 that includes integrated circuit 400. In some embodiments, system 500 includes processing subsystem 510 (with one or more processors) and memory subsystem 512 (with memory).

In general, functions of integrated circuit 400 and system 500 may be implemented in hardware and/or in software. Thus, system 500 may include one or more program modules or sets of instructions stored in a memory subsystem 512 (such as DRAM or another type of volatile or non-volatile computer-readable memory), which, during operation, may be executed by processing subsystem 510. Note that the one or more computer programs may constitute a computer-program mechanism. Furthermore, instructions in the various modules in memory subsystem 512 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the integrated circuit can be used in a wide variety of applications, such as: optical communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of the optical modulator, integrated circuit 400 and/or system 500 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical modulator, integrated circuit 400 and/or system 500 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the optical modulation technique may be used with other materials, as is known to one of skill in the art. Moreover, the composite structure may include polysilicon or amorphous silicon. In some embodiments, the polysilicon layer in the composite optical waveguide is recrystallized into a second single-crystal layer. This can be done, for instance, using laser recrystallization or with thermal recrystallization based on the controlled melting and resolidification of a deposited polycrystalline silicon layer on SOI. This recrystallization may further reduce the loss of the composite optical waveguide. Furthermore, the materials and compounds in the optical modulator may be fabricated using a wide variety of processing techniques, including: evaporation, sputtering, molecular-beam epitaxy, chemical vapor deposition, wet or dry etching (such as photolithography or direct-write lithography), polishing, etc. In an exemplary embodiment, polysilicon layer 214 (FIG. 2) is fabricated using chemical vapor deposition. In addition, a wide variety of optical components may be used in or in conjunction with the optical modulator.

Figure 6:
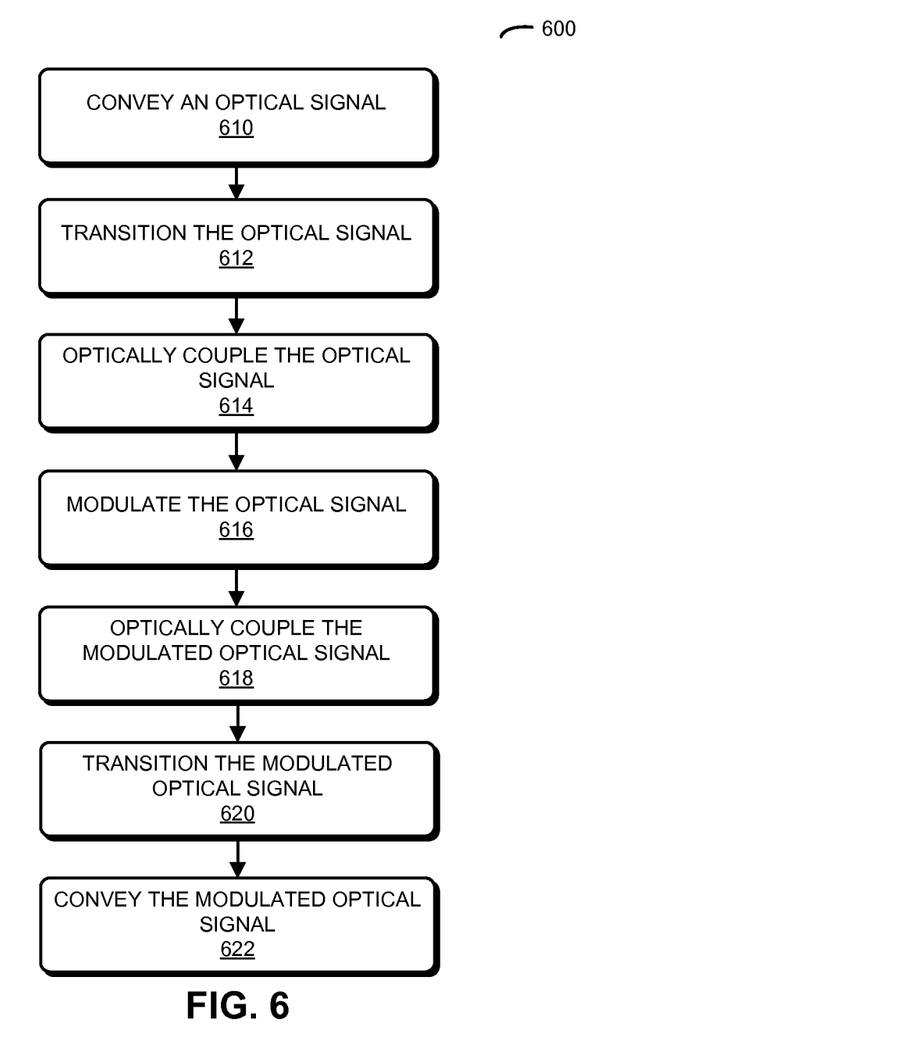
FIG. 6 is a flow chart illustrating a method for modulating an optical signal in accordance with an embodiment of the present disclosure.

We now describe embodiments of a method. FIG. 6 presents a flow chart illustrating a method 600 for modulating an optical signal, which may be performed using an optical modulator (such as optical modulator 100 in FIGS. 1 and 2). During operation, a bus optical waveguide in the optical modulator conveys the optical signal (operation 610), where the bus optical waveguide includes an instance of a composite optical waveguide with a silicon layer, an oxide layer and a polysilicon layer. Then, an optical taper in the optical modulator transitions the optical signal (operation 612) from the silicon layer to the composite optical waveguide.

Moreover, the optical signal is optically coupled (operation 614) from the bus optical waveguide to a disk resonator in the optical modulator, where the disk resonator includes another instance of the composite optical waveguide, a contact for the silicon layer within an inner radius of the disk resonator, and a second contact disposed on the polysilicon layer.

Next, the disk resonator modulates the optical signal (operation 616) based on an electrical signal conveyed by the contact and the second contact, and the modulated optical signal is optically coupled (operation 618) from the disk resonator to the bus optical waveguide.

Furthermore, a second optical taper in the optical modulator transitions the modulated optical signal (operation 620) from the composite optical waveguide to the silicon layer. Additionally, the bus optical waveguide conveys the modulated optical signal (operation 622).

In some embodiments of method 600, there may be additional or fewer operations. Moreover, the order of the operations may be changed, and/or two or more operations may be combined into a single operation.

While the preceding embodiments illustrate the use of the optical modulator in conjunction with optical communication (such as in an optical link), the optical modulator may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising a modulator that includes:
    a bus optical waveguide including an instance of a composite optical waveguide with a first silicon layer, a first oxide layer and a first polysilicon layer; and
    a disk resonator comprising:
        another instance of the composite optical waveguide comprising a second silicon layer, a second oxide layer and a second polysilicon layer;
        a first contact for the second silicon layer within an inner radius of the disk resonator; and
        a second contact disposed on the second polysilicon layer;
        wherein the first contact is n-type and the second contact is p-type.

2. The integrated circuit of claim 1, wherein the second silicon layer, the second oxide layer and the second polysilicon layer constitute a metal-oxide-semiconductor (MOS) capacitor.

3. The integrated circuit of claim 1, wherein the bus optical waveguide includes an optical taper before the disk resonator that transitions the optical mode from the first silicon layer to the composite optical waveguide; and
    wherein the bus optical waveguide includes a second optical taper after the disk resonator that transitions the optical mode from the composite optical waveguide to the first silicon layer.

4. The integrated circuit of claim 1, wherein the disk resonator has a radius less than 5 μm.

5. The integrated circuit of claim 1, wherein the first oxide layer has a thickness less than 10 nm.

6. The integrated circuit of claim 1, wherein the bus optical waveguide and the disk resonator include channel optical waveguides.

7. The integrated circuit of claim 1, wherein the first polysilicon layer is disposed on a buried-oxide layer in a silicon-on-insulator technology.

8. A system, comprising:
    a processor;
    a memory, coupled to the processor, that stores a program module, which, during operation, is executed by the processor; and
    an integrated circuit that includes a modulator comprising:
        a bus optical waveguide including an instance of a composite optical waveguide with a first silicon layer, a first oxide layer and a first polysilicon layer; and
        a disk resonator comprising:
            another instance of the composite optical waveguide comprising a second silicon layer, a second oxide layer and a second polysilicon layer;
            a first contact for the second silicon layer within an inner radius of the disk resonator; and
            a second contact disposed on the second polysilicon layer;
            wherein the first contact is n-type and the second contact is p-type.

9. The system of claim 8, wherein the second silicon layer, the second oxide layer and the second polysilicon layer constitute a metal-oxide-semiconductor (MOS) capacitor.

10. The system of claim 8, wherein the bus optical waveguide includes an optical taper before the disk resonator that transitions the optical mode from the first silicon layer to the composite optical waveguide; and
    wherein the bus optical waveguide includes a second optical taper after the disk resonator that transitions the optical mode from the composite optical waveguide to the first silicon layer.

11. The system of claim 8, wherein the disk resonator has a radius less than 5 μm.

12. The system of claim 8, wherein the first oxide layer has a thickness less than 10 nm.

13. The system of claim 8, wherein the bus optical waveguide and the disk resonator include channel optical waveguides.

14. The system of claim 8, wherein the first polysilicon layer is disposed on a buried-oxide layer in a silicon-on-insulator technology.

15. A method for modulating an optical signal, wherein the method comprises:
conveying the optical signal in a bus optical waveguide, wherein the bus optical waveguide includes an instance of a composite optical waveguide with a first silicon layer, a first oxide layer and a first polysilicon layer;
transitioning the optical signal from the first silicon layer to the composite optical waveguide using an optical taper;
optically coupling the optical signal from the bus optical waveguide to a disk resonator, wherein the disk resonator includes another instance of the composite optical waveguide comprising a second silicon layer, a second oxide layer and a second polysilicon layer, a first contact for the second silicon layer within an inner radius of the disk resonator, and a second contact disposed on the second polysilicon layer, wherein the first contact is n-type and the second contact is p-type;
modulate the optical signal based on an electrical signal conveyed by the first contact and the second contact;
optically coupling the modulated optical signal from the disk resonator to the bus optical waveguide;
transitioning the modulated optical signal from the composite optical waveguide to the first silicon layer using a second optical taper; and
conveying the modulated optical signal in the bus optical waveguide.

16. The method of claim 15, wherein the silicon layer, the oxide layer and the polysilicon layer constitute a metal-oxide-semiconductor (MOS) capacitor.

17. The method of claim 15, wherein the bus optical waveguide and the disk resonator include channel optical waveguides.

18. The method of claim 15, wherein the polysilicon layer is disposed on a buried-oxide layer in a silicon-on-insulator technology.

* * * * *